(12) United States Patent
Kanai

(10) Patent No.: US 7,509,342 B2
(45) Date of Patent: Mar. 24, 2009

(54) FILE DATA STORAGE MANAGEMENT METHOD, FILE DATA STORAGE DEVICE, PROGRAM EXECUTING PROCESSING FOR STORING FILE DATA, AND STORAGE MEDIUM

(75) Inventor: Yuichi Kanai, Bisai (JP)

(73) Assignee: Sanyo Electric Co., Ltd., Osaka (JP)

( * ) Notice: Subject to any disclaimer, the term of this patent is extended or adjusted under 35 U.S.C. 154(b) by 575 days.

(21) Appl. No.: 10/359,056

(22) Filed: Feb. 6, 2003

(65) Prior Publication Data

US 2003/0154206 A1  Aug. 14, 2003

(30) Foreign Application Priority Data

Feb. 8, 2002  (JP) ............................. 2002-031793
Mar. 27, 2002  (JP) ............................. 2002-088273

(51) Int. Cl.
    *G06F 17/30* (2006.01)
(52) U.S. Cl. .................... 707/104.1; 707/100; 707/101; 707/205
(58) Field of Classification Search ....... 707/1, 707/100–102, 104.1, 205; 369/30.1–30.4
    See application file for complete search history.

(56) References Cited

U.S. PATENT DOCUMENTS

| | | | | |
|---|---|---|---|---|
| 5,574,907 A | * | 11/1996 | Jernigan et al. | 707/1 |
| 6,408,301 B1 | * | 6/2002 | Patton et al. | 707/102 |
| 6,549,922 B1 | * | 4/2003 | Srivastava et al. | 707/205 |
| 6,813,685 B1 | * | 11/2004 | Tanaka | 711/114 |
| 2002/0049731 A1 | * | 4/2002 | Kotani | 707/1 |

FOREIGN PATENT DOCUMENTS

| | | |
|---|---|---|
| JP | 8-101783 | 4/1996 |
| JP | 2000-268507 | 9/2000 |
| JP | 2001-265628 | 9/2001 |
| JP | 2001-337851 | 12/2001 |
| JP | 2002-041335 | 2/2002 |
| JP | 2002-041336 | 2/2002 |

* cited by examiner

*Primary Examiner*—CamLinh Nguyen
(74) *Attorney, Agent, or Firm*—McDermott Will & Emery LLP

(57) ABSTRACT

An object of the present invention is to suppress fragmentation occurring due to repeated storing and deleting small capacity file data, while effectively storing large capacity real time file data. To achieve this object, according to the present invention, a block relying on a physical storage area, and a continuous plurality of the blocks, constitute a unit. The unit is set at a capacity at which real time processing is guaranteed. Image data or other such real time file data is stored with in units. Further, in a case of data processed in non-real time, the data is stored in blocks. A unit attribute table for managing the unit is arranged, and based on this unit attribute table, a determination is made as to whether or not the unit can be used at the time of storage.

12 Claims, 15 Drawing Sheets

INFORMATION ON STORAGE MEDIUM AND STRUCTURE OF MANAGEMENT TABLE

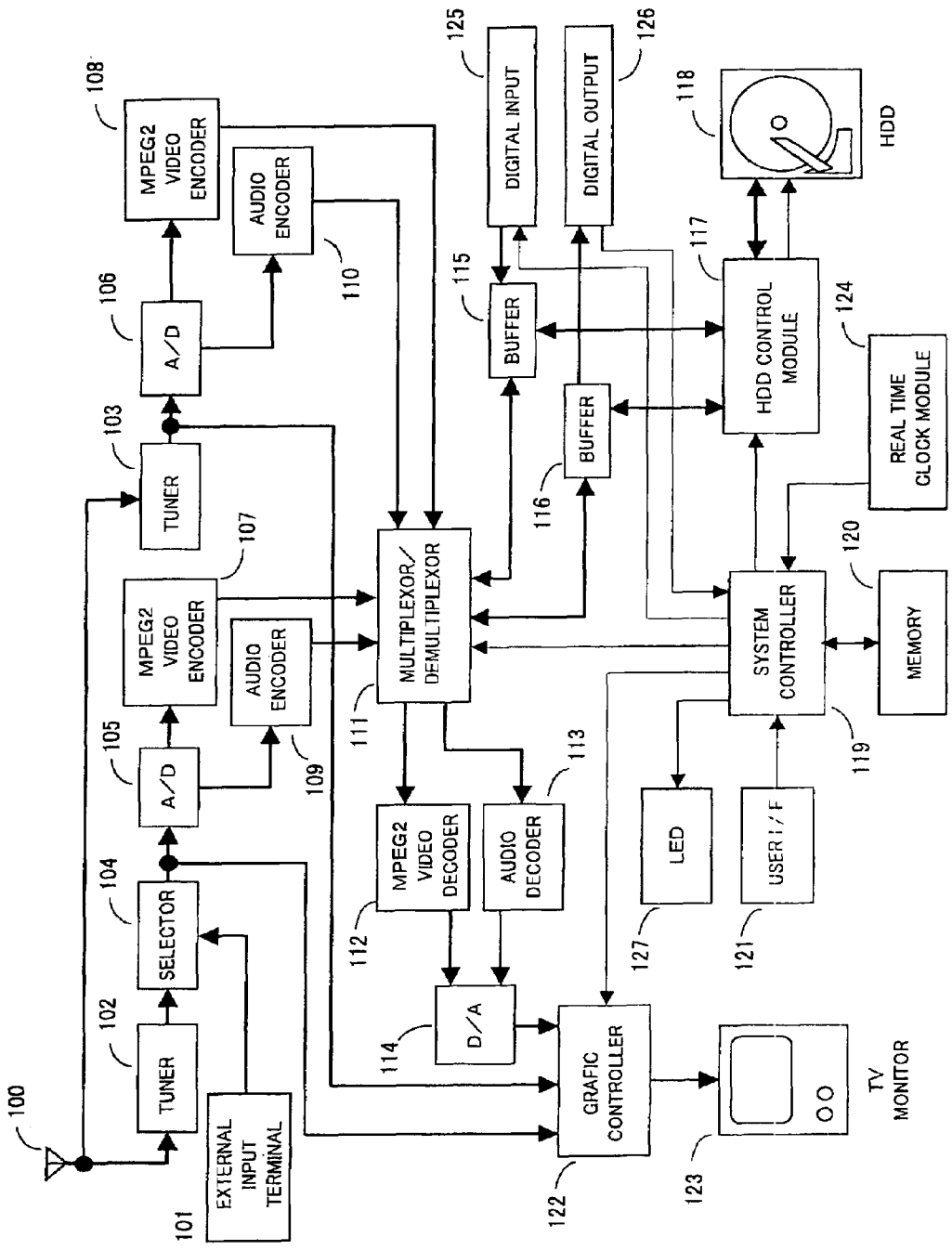
Fig. 1: OVERALL STRUCTURE OF DIGITAL STORAGE AND REPRODUCTION DEVICE ACCORDING TO AN AMBODIMENT

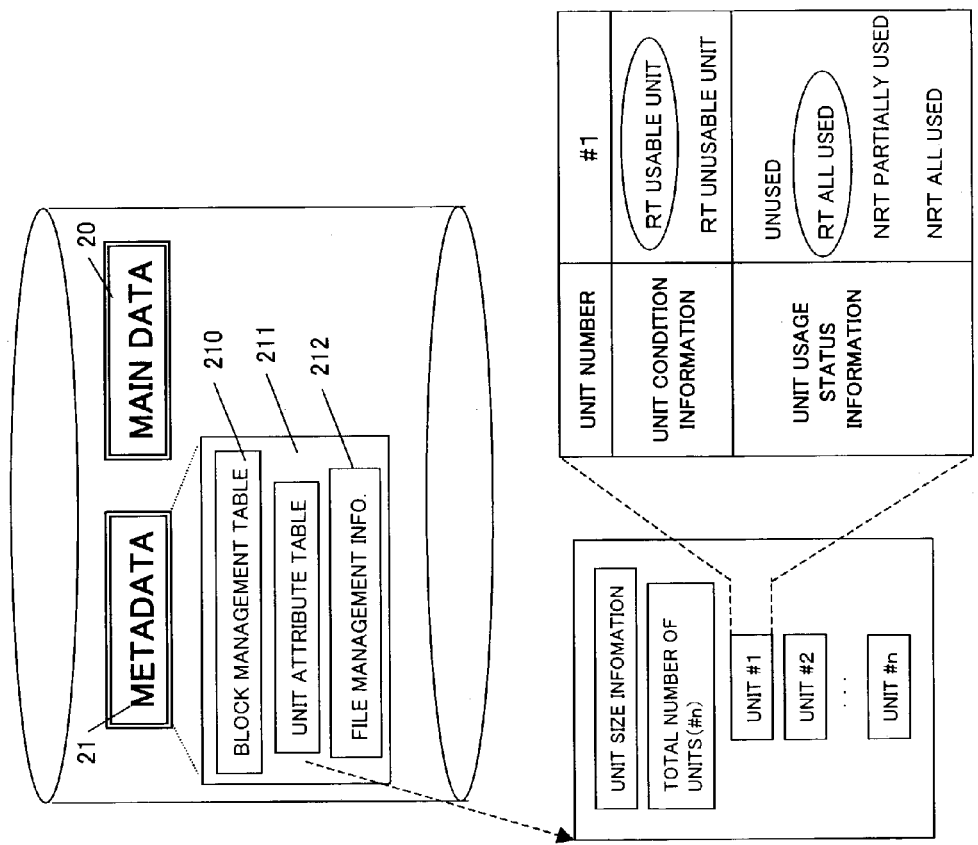
Fig. 2: INFORMATION ON STORAGE MEDIUM AND STRUCTURE OF MANAGEMENT TABLE

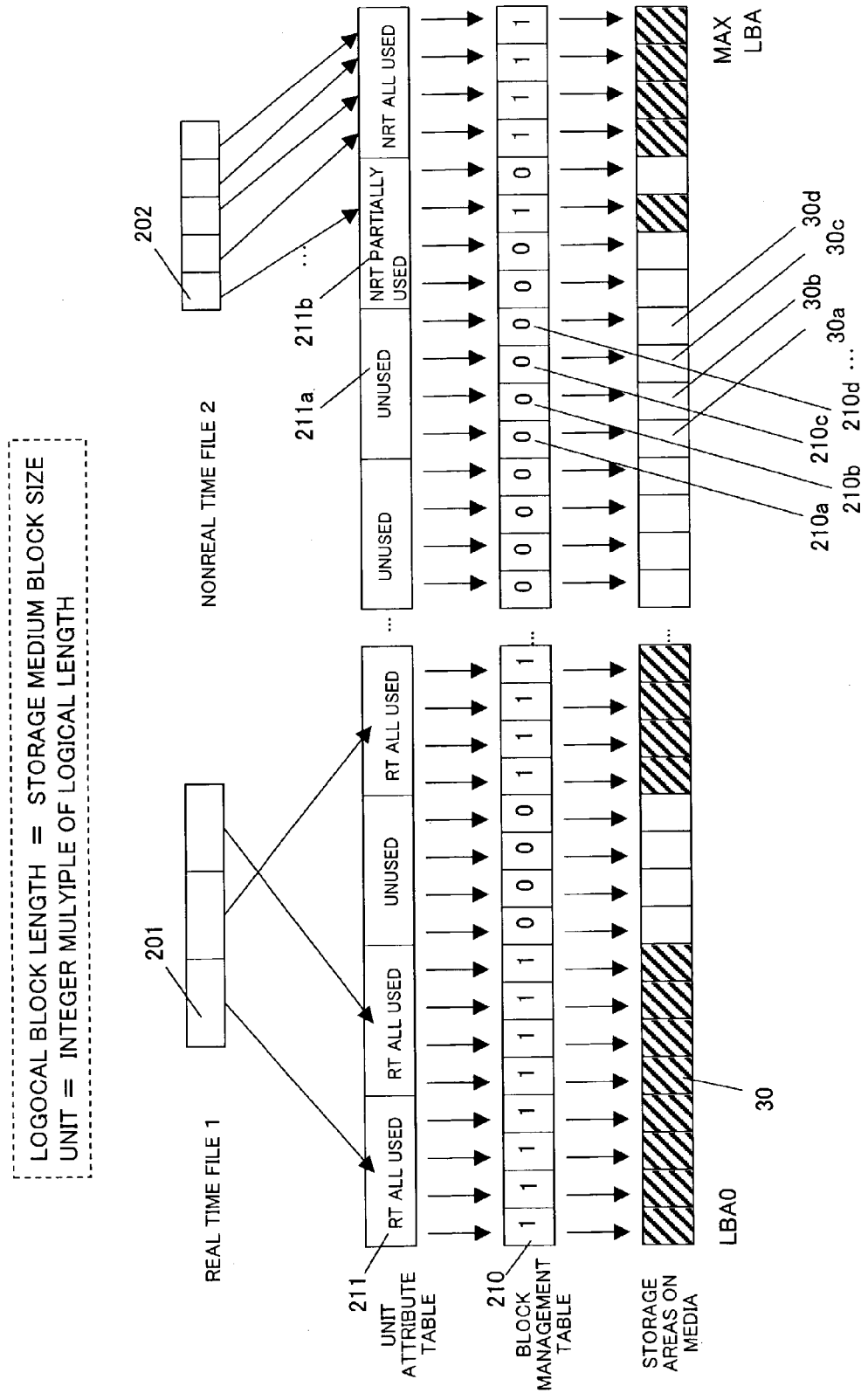

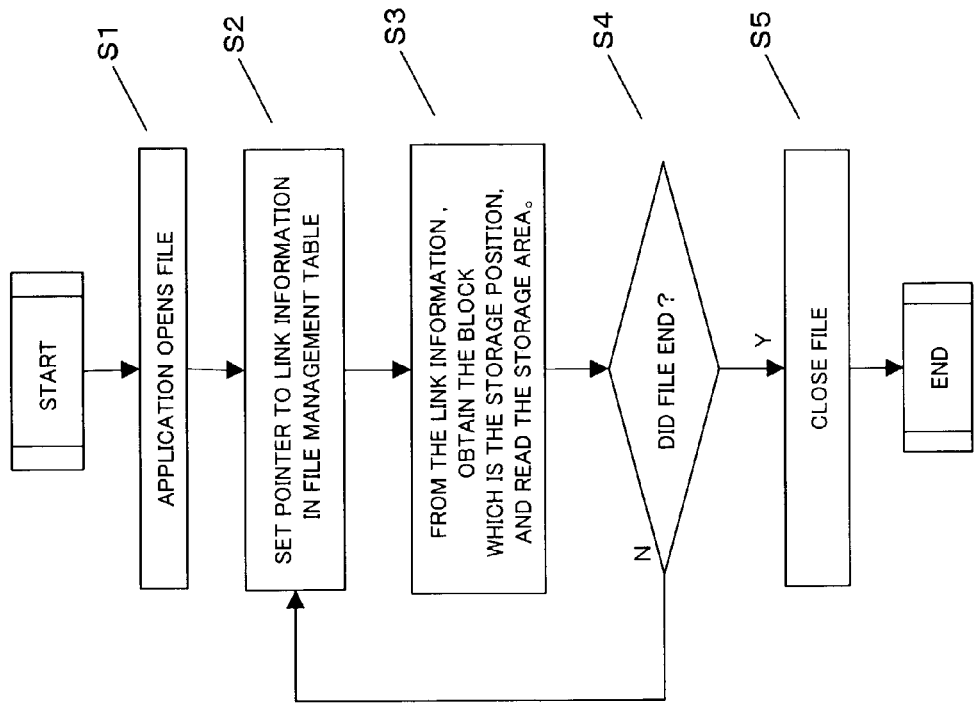
Fig. 4: FLOW OF FILE READING OPERATION

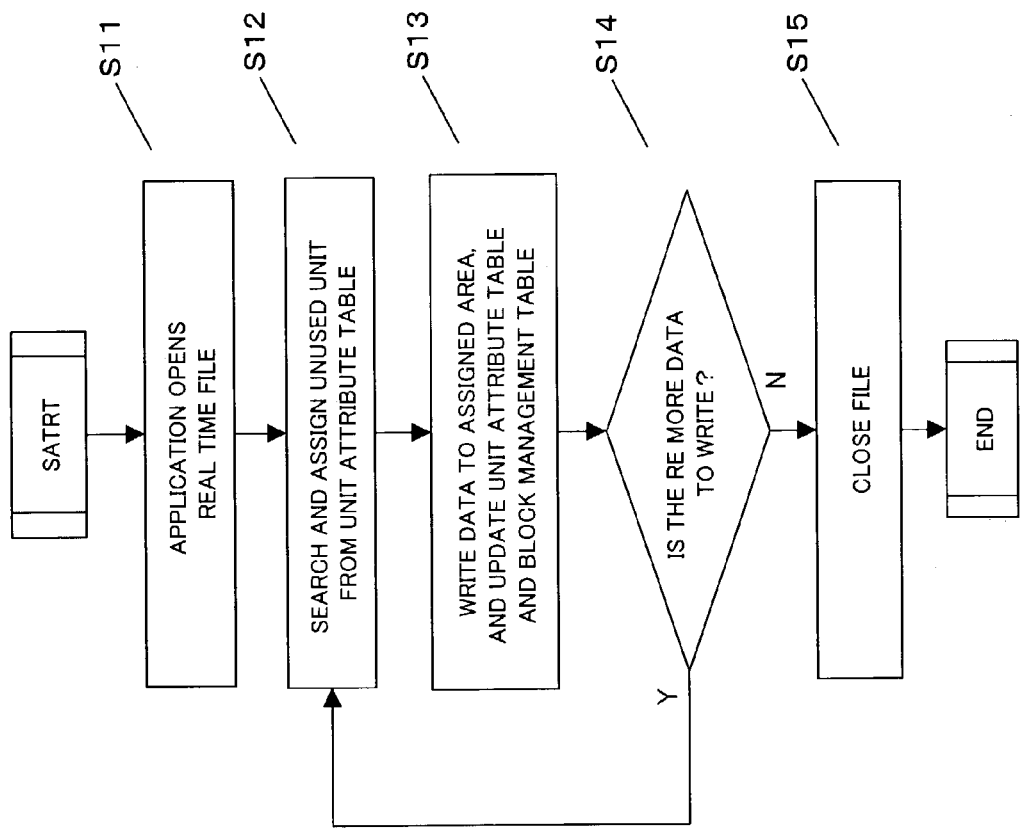
Fig. 5: FLOW OF REAL TIME FILE WRITING OPERATION

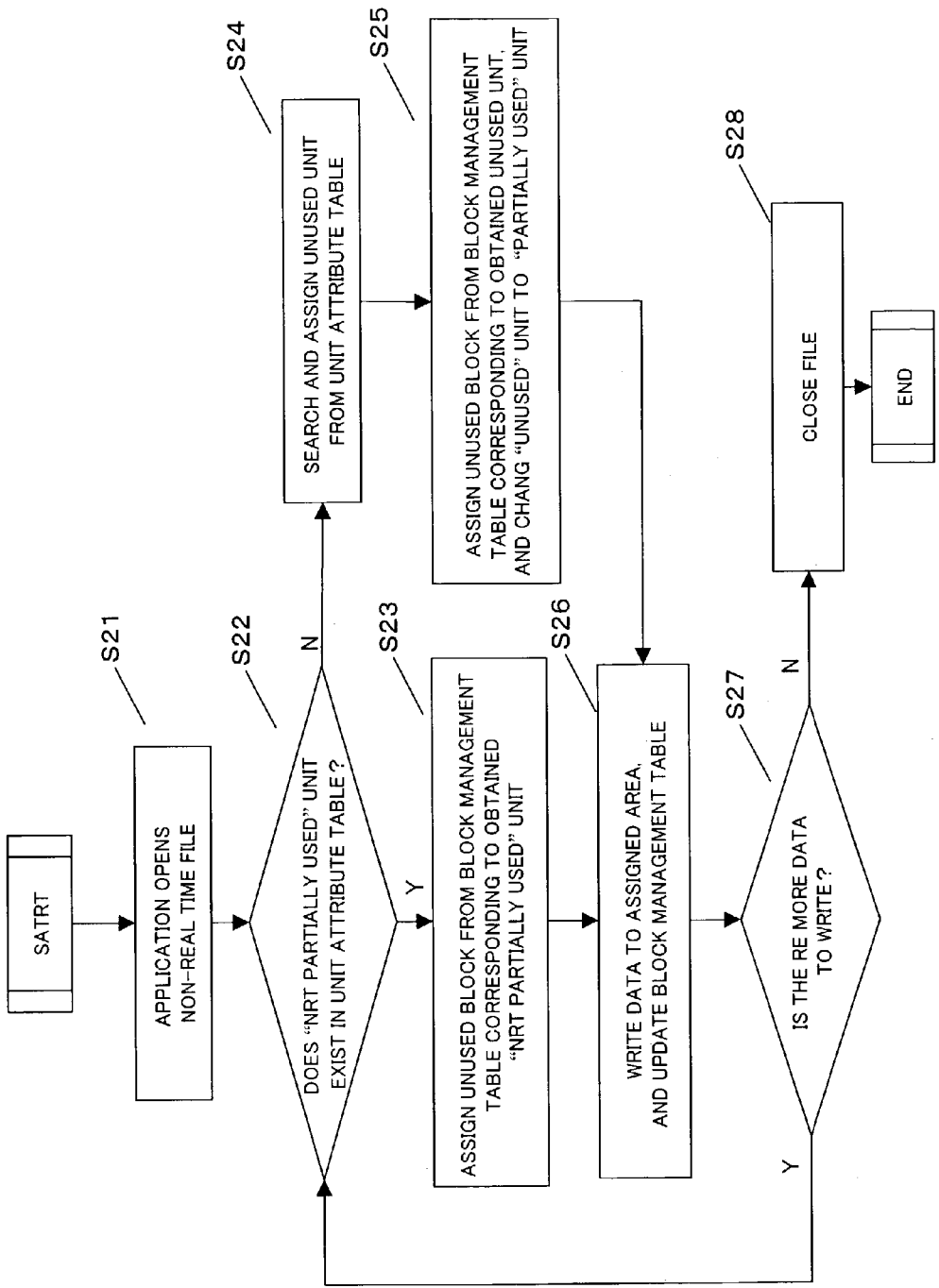
Fig. 6: FLOW OF NON-REAL TIME FILE WRITING OPERATION

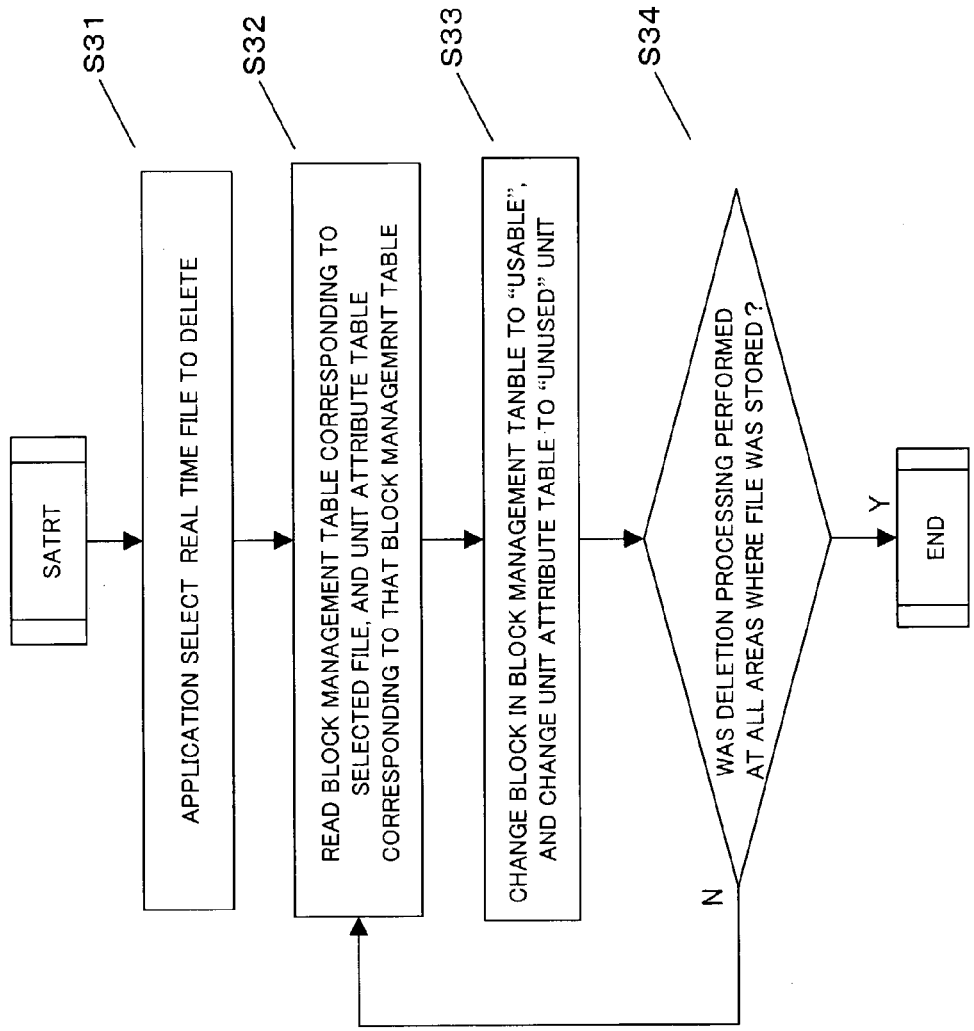
Fig. 7: FLOW OF REAL TIME FILE DELETIONG OPERATION

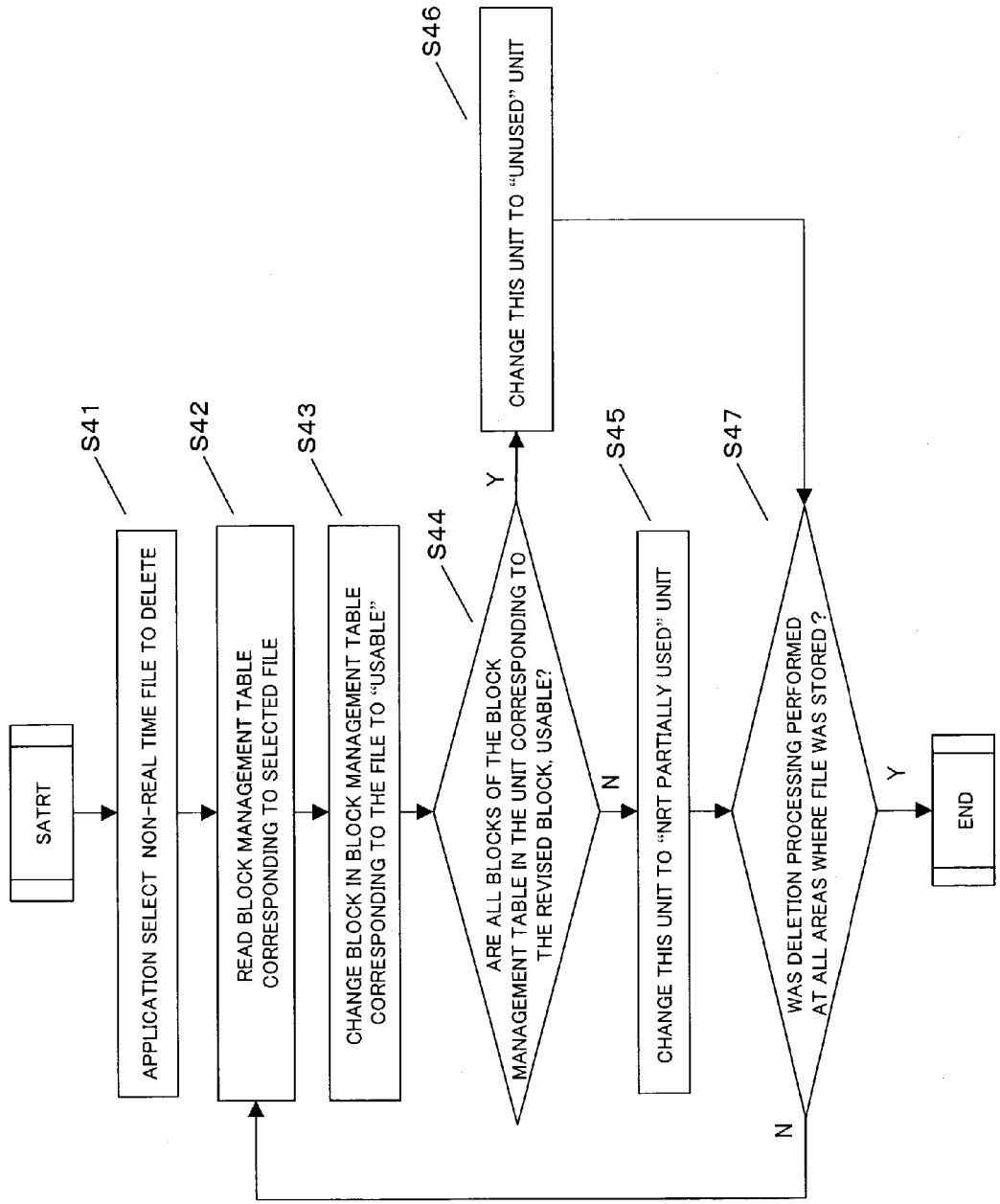
Fig. 8 : FLOW OF NON-REAL TIME FILE DELETIONG OPERATION

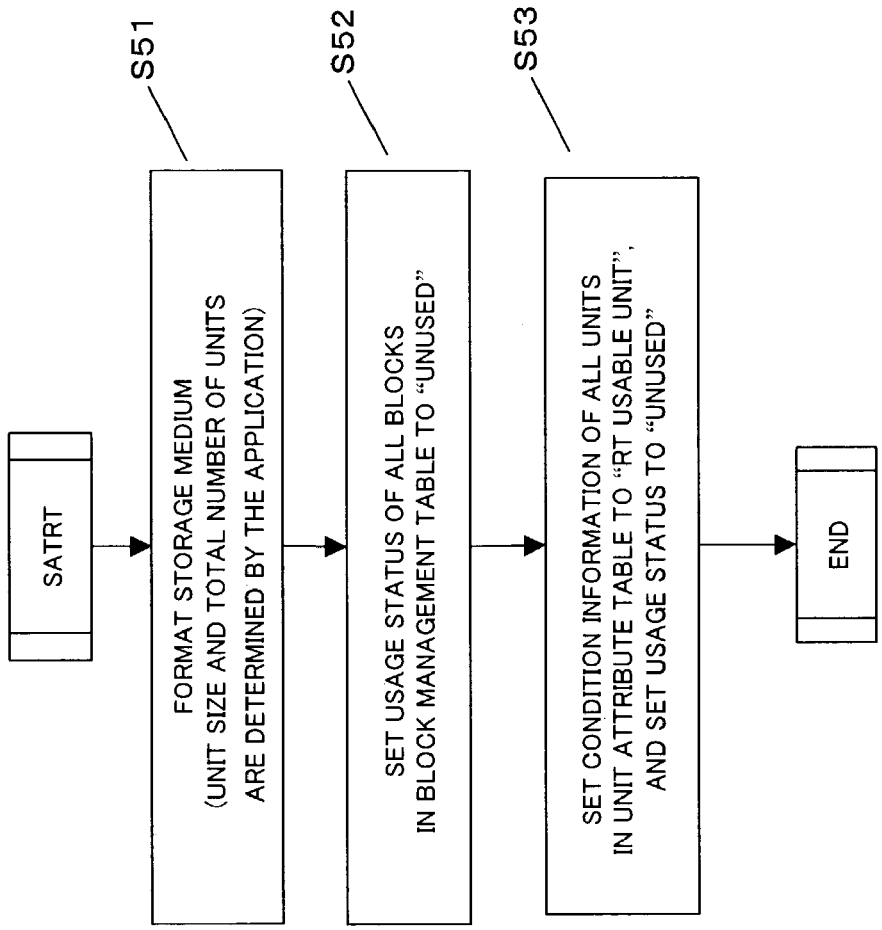
Fig. 9 : FLOW OF INITIALIZATION OPERATION FOR STORAGE MEDIUM

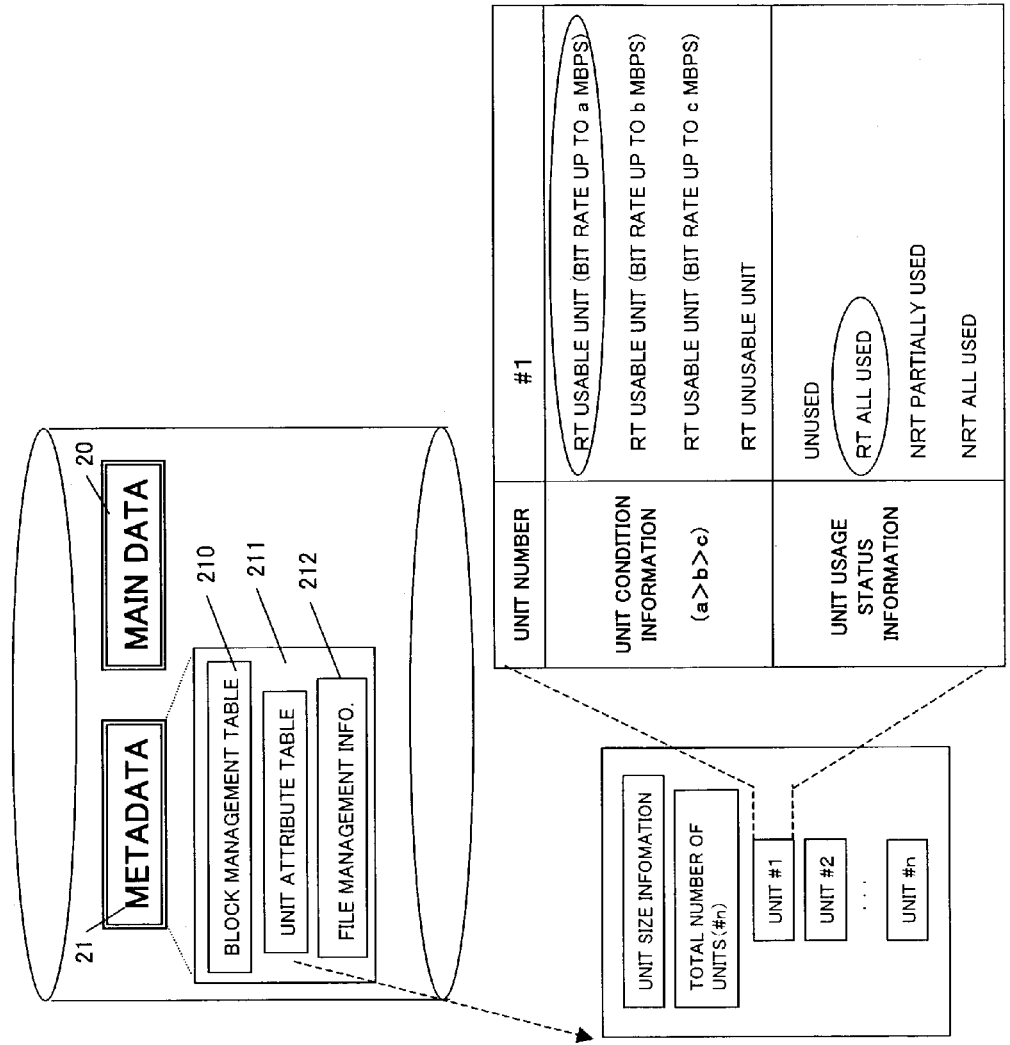
Fig. 10 : INFORMATION ON STORAGE MEDIUM AND STRUCTURE OF MANAGEMENT TABLE

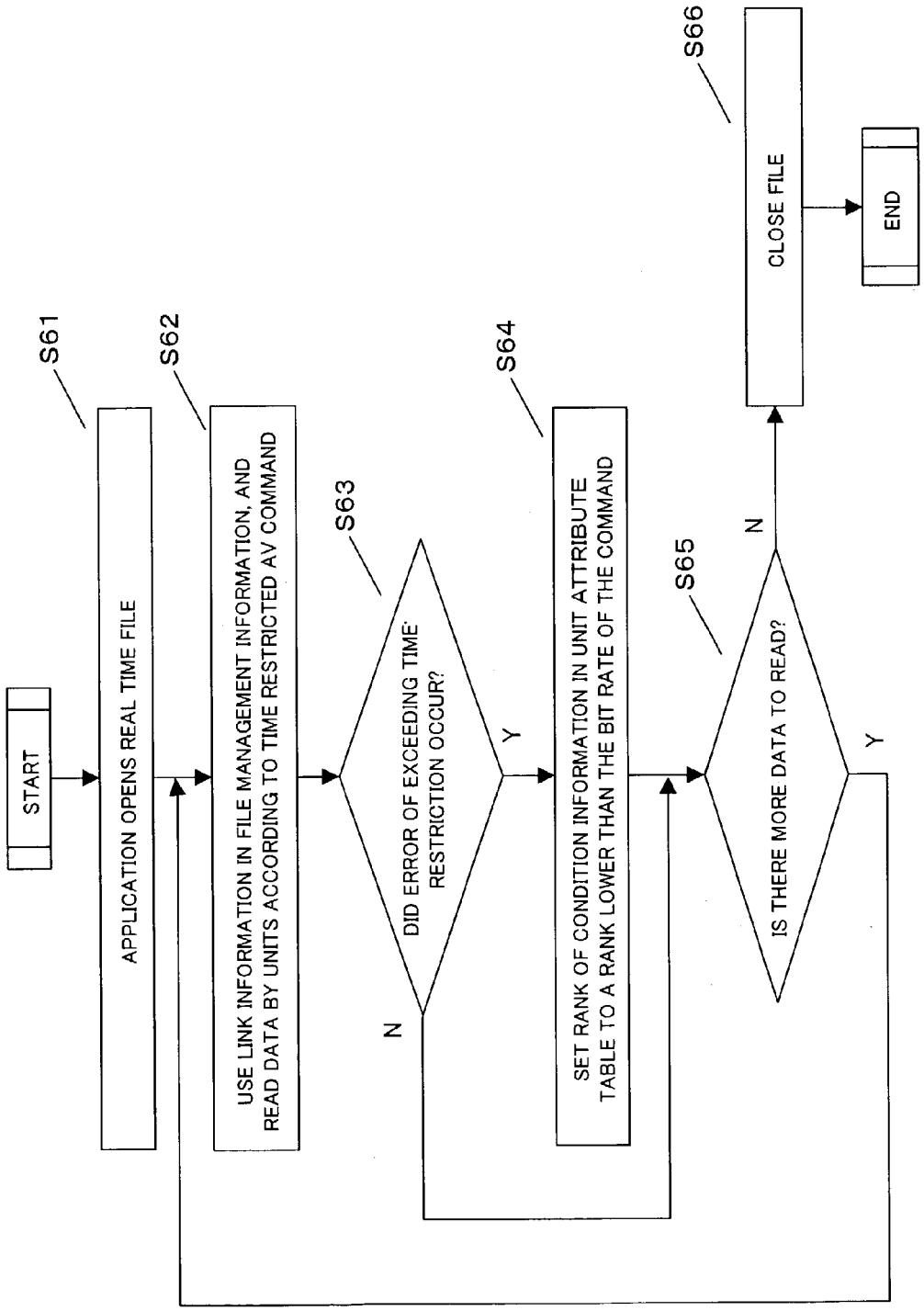
Fig. 11 : FLOW OF REAL TIME FILE READING OPERATION

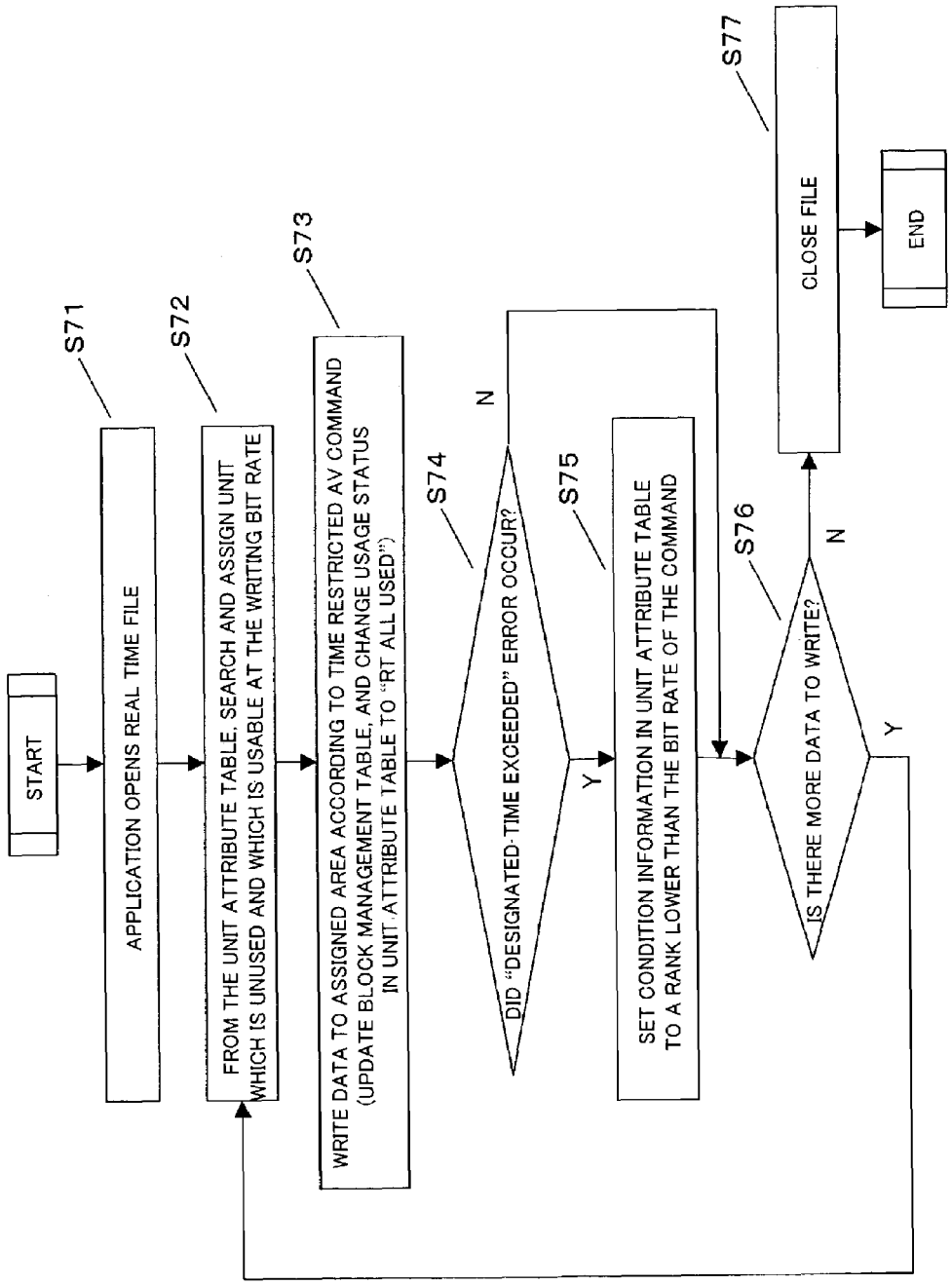
Fig. 12 : FLOW OF REAL TIME FILE WRITING OPERATION

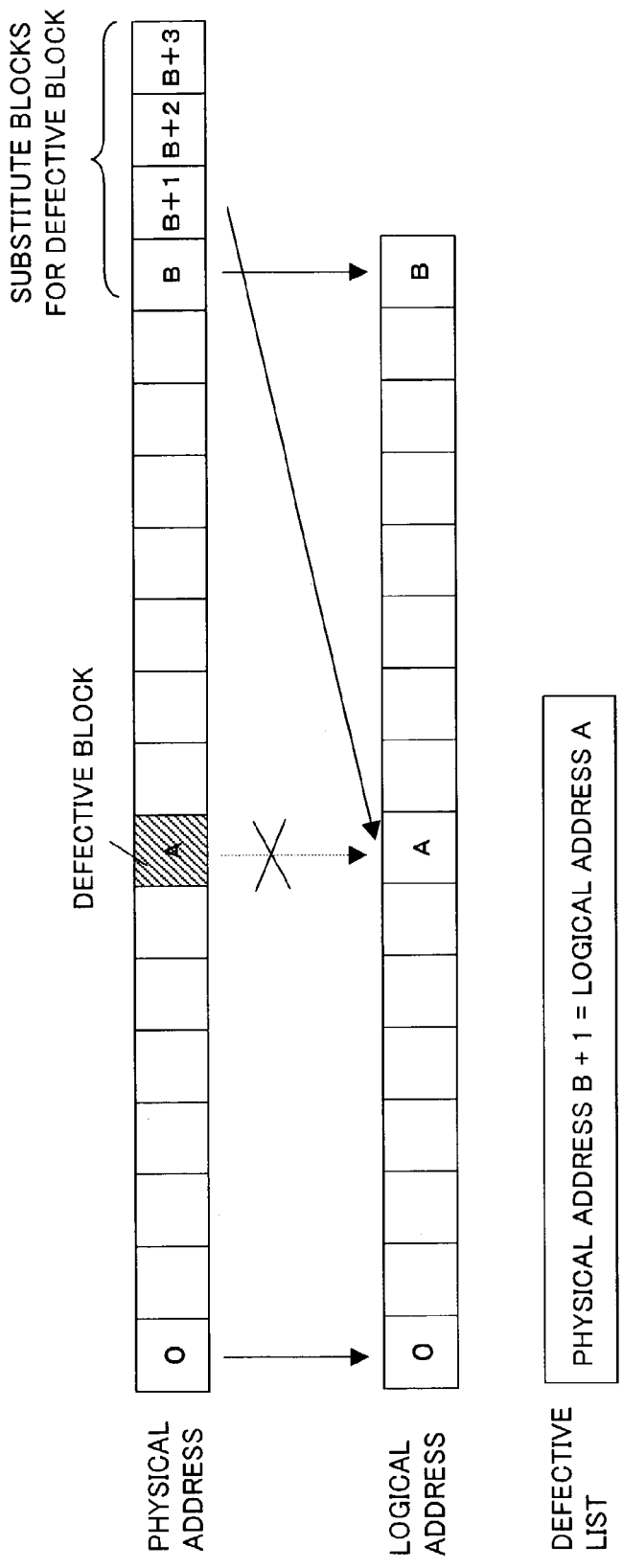
Fig. 13: RELATIONSHIPS AMONG PHYSICAL ADDRESS ON THE MEDIA, LOGICAL ADDRESS, AND DEFECTIVE SECTOR LIST

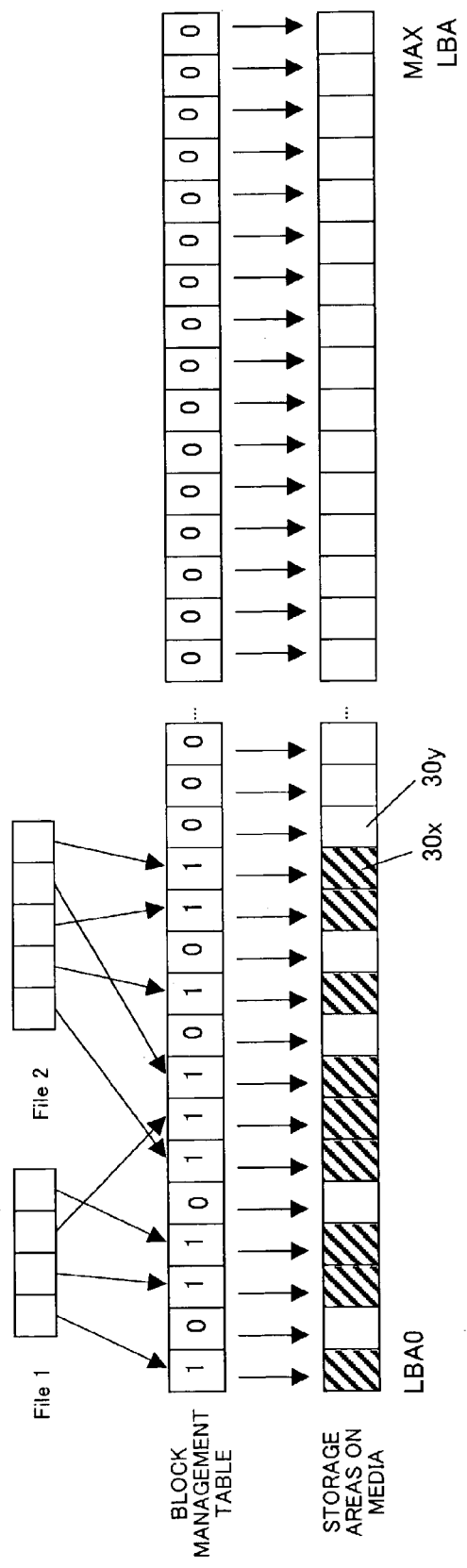
Fig. 14: FILE STRUCTURE ACCORDING TO CONVENTIONAL STORAGE METHOD

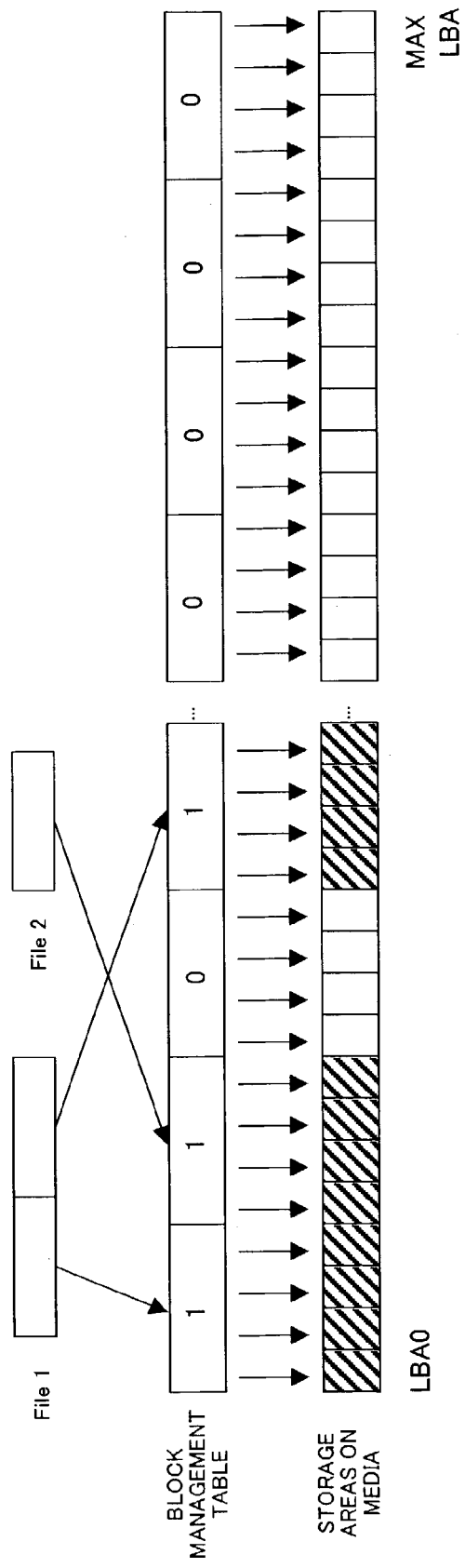
Fig. 15 : FILE STRUCTURE ACCORDING TO CONVENTIONAL STORAGE METHOD

FILE DATA STORAGE MANAGEMENT METHOD, FILE DATA STORAGE DEVICE, PROGRAM EXECUTING PROCESSING FOR STORING FILE DATA, AND STORAGE MEDIUM

BACKGROUND OF THE INVENTION

1. Field of the Invention

The present invention relates generally to file data storage management method, file data storage device, program executing processing for storing file data, and storage medium which are capable of efficiently storing real time file data and non-real time file data.

2. Description of the Related Art

Up to now, in a case where data constituting one file (hereinafter, referred to as file data) is stored onto a storage medium, a method is used in which the file data is assigned to blocks obtained by dividing a storage area of the storage medium into predetermined identical capacity areas. In accordance with this file storage method, use/non-use of each block is managed by means of a block management table.

The storing of the file data is performed by referencing the block management table to search for an unused block, and assigning the file data to a plurality of the unused blocks used for storing the data according to the file data capacity. When this is performed, a file structure table indicating which block was used to store the file information, is generated. As the file structure table, for example, a FAT (File Allocation Table) or the like may be used. The FAT determines physical connections to the blocks constituting the file. Specifically, a unique block number assigned to each block is used, and the table is generated which links the block numbers with logically continuous block numbers for all the blocks in the storage medium.

In a case of storing the file data which has a capacity greater than a block length, for example, image, audio, or other such data having a large capacity, the data is stored across a plurality of blocks. Here, if the data is stored scatteredly across physically non-continuous areas on the storage medium, when these data are processed and read out in real time, time required for a drive head to move makes smooth access impossible, and there is a possibility that continuous data processing becomes difficult. Therefore, when considering storing the large capacity data to be processed in real time, the capacity of one block should be set large, to secure as large a physically continuous area as possible.

On the other hand, the data capacity of the file varies depending on the file type. An extremely small capacity file, such as an extremely small document file, exists as well.

However, according to the current file storage method, since the file data is stored by blocks, 2 or more sets of file data cannot be stored in 1 block. Therefore, when the block capacity is set too large, inside the block, idle areas in which the actual data is not stored but the file data cannot be stored, increase. As a result, a problem occurs in which a usage efficiency of the storage area drastically deteriorates.

Conversely, if the block capacity is set too small, when the large capacity file data is to be stored, the number of linked blocks becomes extremely large, and deterioration of accessibility when the data is read is a concern.

Further, due to abundant input/output of the data, when the storing/deleting of the data is repeated, it becomes difficult to secure the physically continuous idle area, which leads to a problem in that so-called fragmentation occurs.

FIG. 14 shows an example of assigning the file data to the storage medium, and a block management table and a usage status of each block at this time. In the block management table in FIG. 14, "1" indicates a status of being used, and "0" indicates an unused status. Further, a hatched portion 30x in the diagram indicates the used block, and a blank portion 30y indicates the unused idle block. In FIG. 14, the empty blocks are scattered about, and fragmentation has occurred.

In contrast, for example, as shown in FIG. 15, the management table can be structured such that 4 blocks are seen as 1 block. By thus expanding the data capacity handled in the block management table, the above-mentioned fragmentation problem can be resolved to a certain extent. However, when this is done, the usage efficiency of the storage area drastically deteriorates, as described above.

Therefore, an object of the present invention is to resolve these problems and provide a data storage method in which the file data are assigned suitably for real time file storage and reproduction, while the occurrence of fragmentation is suppressed, to thereby enable to efficiently store and reproduce even the small capacity file data.

SUMMARY OF THE INVENTION

In the present invention, a unit includes a continuous plurality of blocks, and an attribute of the unit is managed by means of a unit attribute table. The unit attribute table contains a usage status of each unit, and information determining whether or not real time data can be stored. "Real-time data" connotes data with required processing of a defined capacity thereof in a definite period of time. For example, video data, audio data, etc., are real-time data. If real-time processing fails when reproducing these data, motion of a playback video image will stop or the flow of a playback audio sound will break off. "Non-real-time data" connotes data which does not need to be processed in a definite period of time. For example, text data, still picture data, etc., are "non-real-time data."

In a case where the file data to be stored is the real time data, the unit attribute table is referenced, an unused unit where the real time data can be stored is searched, and the file data is stored into the block corresponding to the searched unit. Further, in a case where the file data to be stored is non-real time data, the unit attribute table is referenced, and a unit where the non-real time data is already stored in a portion of the blocks is searched, and the file data is stored into the unused block corresponding to the unit obtained from the search.

In this way, depending on whether the file data stored is the real time data or non-real time data, a storage processing is altered, so that the number of the unused units can be increased, whereby the real time data can be efficiently stored.

According to one aspect of the present invention, it can be understood that a file data storage management method includes:

a block management table for managing whether or not data is being stored in the block;

A unit attribute table for managing an attribute of the unit including a continuous plurality of blocks; and data storage processing for storing the file data based on the unit attribute table.

According to the above aspect of the invention, the unit attribute table includes a usage status of each unit, and information determining whether or not real time data can be stored. Further, in the data storage processing, in a case where the stored file data is the real time data, the unit attribute table is referenced, an unused unit where the real time data can be stored is searched, and the file data is stored into the block corresponding to the searched unit, and in a case where the stored file data is non-real time data, the unit attribute table is referenced, and a unit where the non-real time data is already stored in a portion of the blocks is searched, and the file data is stored into the unused block corresponding to the unit obtained from the search.

According to another aspect of the present invention, it can be understood that a file data storage device includes:

a block management table generating portion for generating a block management table for managing whether or not data is being stored in the block;

A unit attribute table portion for generating a unit attribute table for managing an attribute of the unit including a continuous plurality of the blocks; and a data storing portion for executing processing to record the file data based on the unit attribute table.

According to further another aspect of the present invention, it can be understood that a file data storage device includes:

means for generating a unit attribute table for managing an attribute of the unit including a continuous plurality of the blocks; and means for generating a unit attribute table for managing an attribute of the unit constituted by a continuous plurality of the blocks; and means for executing processing for storing the file data based on the unit attribute table.

According to further another aspect of the present invention, it can also be understood that a program for executing processing includes:

processing for generating a block management table for managing whether or not data is stored in the block;

processing for constructing a unit from a continuous plurality of the blocks, and generating a unit attribute table for managing an attribute of each unit; and data storage processing for storing the file data based on the unit attribute table.

According to further another aspect of the present invention, it can also be understood that a storage medium stores in addition to main data, at least:

a block management table for managing whether or not data is stored in the block; and a unit attribute table for managing a unit attribute of a unit including a continuous plurality of the blocks.

As an improvement of the above-mentioned respective aspects, the unit attribute table may further include information determining a read and/or write rate rank of each for each unit. At this time, in the data storage processing in the respective aspects: in a case where the stored file data is the real time data, the unit attribute table is referenced, the unused unit satisfying the write and/or read rate required for the file data is searched, and the file data is stored into the block corresponding to the searched unit.

By using the above-mentioned structures, various real time file data requiring different bit rates can be efficiently divided up and stored into the storage area, thereby achieving a further merit that the usage efficiency of the storage area can be improved.

The above-mentioned objects and other objects and novel characteristics of the present invention should become more completely evident when the explanations of the embodiments mentioned below are read in light of the attached drawings. However, the embodiments mentioned below are essentially examples of the present invention, and do not limit the scope of the present invention.

BRIEF DESCRIPTION OF THE DRAWINGS

In the accompanying drawings:

FIG. 1 shows an overall structural diagram of a storage and reproduction device according to a first embodiment;

FIG. 2 shows a diagram illustrating a structure of storage information according to the first embodiment;

FIG. 3 shows a diagram schematically illustrating a storage method according to the first embodiment;

FIG. 4 shows a flowchart of a read operation according to the first embodiment;

FIG. 5 shows a flowchart of a write operation according to the first embodiment;

FIG. 6 shows a flowchart of another write operation according to the first embodiment;

FIG. 7 shows a flowchart of a deletion operation according to the first embodiment;

FIG. 8 shows a flowchart of another deletion operation according to the first embodiment;

FIG. 9 shows a flowchart of an initialization operation of a storage medium according to the first embodiment;

FIG. 10 shows a diagram illustrating a structure of storage information according to a second embodiment;

FIG. 11 shows a flowchart of a read operation according the second embodiment;

FIG. 12 shows a flowchart of a write operation according the second embodiment;

FIG. 13 shows a diagram illustrating relationships among a physical address on a media, a logical address, and a defective sector list;

FIG. 14 shows a diagram illustrating a structure of a file according to a conventional file storage method; and FIG. 15 shows a diagram illustrating another structure of a file according to another conventional file storage method.

DESCRIPTION OF PREFERRED EMBODIMENTS

Hereinafter, embodiments of the present invention are explained, with reference to the drawings.

A. First Embodiment

FIG. 1 is a block diagram showing an overall structure of a digital storage and reproduction device, according to an embodiment of the present invention. Note that, in FIG. 1, signal lines indicated with bold lines are signal lines representing a flow of image and/or audio data, and signal lines indicated with thin lines are signal lines representing a flow of control signals.

The digital storage and reproduction device includes an antenna 100, an external input terminal 101, tuners 102 and 103, a selector 104, A/D converters 105 and 106, MPEG2 video encoders 107 and 108, audio encoders 109 and 110, a multiplexor/demultiplexor 111, an MPEG 2 video decoder 112, an audio decoder 113, a D/A converter 114, buffer memories 115 and 116, a hard disk drive controller module 117, a hard disk drive 118, a system controller 119, a memory 120, a user interface 121, a graphic controller 122, a television monitor 123, a real time clock module 124, a digital input 125, a digital output 126, and an LED 127.

With reference to FIG. 1, for example, television broadcast signal waves received by the antenna 100 are simultaneously sent to the tuners 102 and 103.

The tuner 102 selects from the signal waves received by the antenna 100 the signal wave of 1 channel designated by a user, and demodulates it into an analog television signal composed of an image signal and an audio signal, and inputs it into a one-way input of the selector 104. To another input of the selector 104, there is connected an external input terminal 101 which is connectable to a video cassette recorder (VCR) and a cam corder, and other various external television signal sources.

The selector 104 selects either an output from the tuner 102 or an input from the external input terminal 101, and sends it to the A/D converter 105, and also sends it to 1 input of the graphic controller 122. Generally, in a case where some sort of external signal source is connected to the external input terminal 101, the selector 104 selects the input from the external input terminal 101, and in a case where such is not connected, the selector 104 selects the output from the tuner 102.

The A/D converter 105 converts the image signal and the audio signal of the analog television signal outputted from the selector 104 into digital signals respectively, and sends the digital image signal to the MPEG2 video encoder 107, and sends the digital audio signal to the audio encoder 109.

The MPEG2 video encoder 107 compresses the sent digital image signal and sends it to the multiplexor/demultiplexor 111, and the audio encoder 109 compresses the sent digital audio signal and sends it to the multiplexor/demultiplexor 111. The multiplexor/demultiplexor 111 multiplexes the sent image signal stream and the audio signal stream, and converts them into an MPEG2 system stream.

On the other hand, the tuner 103 selects from the signal wave received by the antenna 100 a signal wave of 1 channel designated by the user, and demodulates it into the analog television signal composed of the image signal and the audio signal, and sends it to the A/D converter 106, and also sends it to another input of the graphic controller 122.

The A/D converter 106 converts the image signal and the audio signal of the analog television signal outputted from the tuner 103 into digital signals respectively, and sends the digital image signal to the MPEG2 video encoder 108, and sends the digital audio signal to the audio encoder 110.

The MPEG2 video encoder 108 compresses the sent digital image signal and sends it to the multiplexor/demultiplexor 111, and the audio encoder 110 compresses the sent digital audio signal and sends it to the multiplexor/demultiplexor 111. The multiplexor/demultiplexor 111 multiplexes the sent image signal stream and the audio signal stream, and converts them into the MPEG2 system stream.

Removably attached to the digital storage and reproduction device is a hard disk drive (hereinafter, referred to as an HDD) 118 with a built in hard disk, as one example of a randomly accessible storage medium. In the following description, as a matter of convenience, it is assumed that data can be written/read to/from the standalone HDD 118 itself. Writing data to the HDD 118 and reading data from the HDD 118, are executed by the HDD controller module 117, as described below.

Between the above-mentioned multiplexor/demultiplexor 111 and the HDD controller module 117, there is provided a 2-system data channel which is composed of a first data bus including the buffer memory 115 on a part of it, and a second data bus including the buffer memory 116 on a part of it.

Further, via the digital input 125, digital data from another externally connected device can be inputted into the buffer memory 115. On the other hand, digital data in the buffer memory 116 can be read out to another externally connected device via the digital output 126.

Therefore, as described below, via the buffer memories 115 and 116, the MPEG2 system stream data is exchanged among the multiplexor/demultiplexor 111, the HDD controller module 117, the digital input 125 and the digital output 126.

The multiplexor/demultiplexor 111 demultiplexes the MPEG2 system stream received from the buffer memories 115 and 116 into the image signal stream and the audio signal steam, and sends the former to the MPEG2 video decoder 112 and the latter to the audio decoder 113.

The MPEG2 video decoder 112 decodes the sent image signal stream and sends it to the D/A converter 114, and the audio decoder 113 decodes the sent audio signal stream and sends it to the D/A converter 114. The D/A converter 114 converts each of the sent signals into respective analog signals, and sends the analog television signal composed of the image signal and the audio signal to yet another input of the graphic controller 122.

The graphic controller 122 selects any of the analog television signals sent respectively from the selector 104, the tuner 103 and the D/A converter 114, and sends it to the television monitor 123 connected to the outside of the digital storage and reproduction device.

Operations of the multiplexor/demultiplexor 111 and the graphic controller 122 are controlled by control signals provided from the system controller 120.

Further, when the digital storage and reproduction device is connected to another external device via the digital input 125 and the digital output 126, the control signal from the system controller 119 is sent via the digital input 125 (thin line), to a system controller (not shown) of the other device, and a control signal from the system controller is sent via the digital output 126 (thin line) to the system controller 119 of the digital storage and reproduction device.

To the system controller 119, there are connected the user interface 121, the memory 120 and the real time clock module 124.

Basic operational principles of storing, reproducing, deleting, and the like by the above-mentioned digital storage and reproduction device according to the present invention shown in FIG. 1, are explained in detail below, in relation to a method of storing a file to the hard disk drive 118.

Next, explanation is made regarding information stored in the hard disk, which is a storage medium in accordance with this embodiment.

As shown in FIG. 2, in a case where data is stored as a file on the hard disk which is a storage medium, the image or audio or other such data itself to be stored (hereinafter, referred to as main data 20), and management information (hereinafter, referred to as metadata 21), which is necessary for the main data 20 to be constituted as a file, are stored on the hard disk.

The metadata 21 is composed of 3 types of information, that is, a block management table 210, a unit attribute table 211 and file management information 212, which, in this digital storage and reproduction device, are generated at an initial setting time of the storage medium, and are updated each time data is stored or deleted.

Hereinafter, each of the above-mentioned management information is explained using FIG. 3.

FIG. 3 is a diagram for schematically explaining the storage method using the unit attribute table.

<Block Management Table>

The block management table 210 manages the usage status of each block. Entries 210a, 210b, 210c, 210d . . . which include the block management table 210, correspond to the blocks of memory areas 30a, 30b, 30c, 30d . . . In response to the usage state of the block, when the block is in use the entry shows "1", and when the block not in use the entry shows "0".

<Unit Attribute Table>

The unit attribute table 211 regards the storage area on the HDD 118 as address space divided into units, and assigns unit numbers to them in sequence, and thus manages the usage status of each unit.

The unit is composed of entries 211a, 211b . . . For example, the entry 211a is the entry of the unit corresponding to the entries 210a, 210b, 210c and 210d on the block management table 210. The unit attribute table 211 indicates a unit condition information showing whether or not the real time file can be stored in the unit, and a unit usage status information showing the usage status of the unit.

Here, whether or not the real time file can be stored in the unit, is determined, for example, similarly to a determination according to a second embodiment described below, by monitoring a storage/reproduction operation by special commands such as Time-Restricted Reading/Writing Command in case of second embodiment for executing reading/writing, and making the determination on whether or not the real time storage/reproduction can be guaranteed.

The unit condition information and the unit usage status information of each unit, are divided as shown in FIG. 2. In the unit usage status information, the term "unused" refers to a status in which all the blocks comprising the unit can be stored into. Further, the term "RT all used" refers to a status in which all the blocks comprising the unit are being used continuously for storing the real time files. Further, the term "NRT partially used" refers to a status in which some of the blocks comprising the unit are being used for storing the non-real time file. Further, the term "NRT all used" refers to a status in which all the blocks comprising the unit are being used for storing the non-real time file.

The unit has a size necessary for the real time processing. There is no status in which the real time file is partly being used. Further, both the real time file and the non-real time file never exist in the same unit. Therefore, in the case where the unit is "NRT partially used", the remaining blocks can only store the non-real time file.

<File Management Information>

Returning to FIG. 2, the file management information 212 is management information for the main data 20 to be recognized as a file.

In the file management information 212 of the file corresponding to the main data 20, there is stored link information of block comprising the main data 20. Specifically, the main data 20 attribute information (not shown), and block start address information, are stored in the sequence in which they will be referenced.

The above-mentioned attribute information includes information indicating whether or not the main data 20 is data to be processed in real time.

The real time file 201 (see FIG. 3) stores the main data 20 to be processed in real time, such as the MPEG2 system stream generated by the above-mentioned multiplexor/demultiplexor 111, as the above-mentioned unit data.

Therefore, an entire capacity of the real time file 201 is necessarily an integer multiple of the unit capacity. Further, also in the HDD 118 where data is stored in the block units, the start address of the real time file 201 must be an address indicating a border of the unit. This is because in the unit attribute table 211 the storage space is regarded as the address space of the unit.

In the file management information 212 showing a file structure of the real time file 201, there is stored the link information of the block corresponding the unit to which the real time file 201 was assigned.

In the case of the non-real time file 202, the main data 20 which is not necessary for processing in real time, is stored as block unit data. Therefore, the entire capacity of the non-real time file 201 is a multiple integer of the block unit capacity.

Further, in the file management information 212 showing a file structure of the non-real time file 202, similarly to the case of the real time file, there is stored the link information of the block which the non-real time file 202 is assigned to.

<Unit Capacity>

Next, in accordance with this digital storage and reproduction device, explanation is given regarding a unit capacity necessary for simultaneously treating a plurality of stream data in real time.

First, explanation is given regarding relationships among a capacity C of the buffer memories 115 and 116, a write/read unit block length L, a worst-case data transfer rate Bhdd between the HDD controller module 117 and the HDD 1118, an MPEG2 system stream rate Bsys, and an HDD 118 seek time worst value Tw.

However, the seek time worst value Tw is not merely the time needed for a head to seek. It is a time duration determined by considering worst values of all group delays, such as a seek time, a rotation wait time, a head switch time, time required to correct ECC/EDC and other such errors, occurring after the seek is started until the actual data reading/writing is started.

In a case where a number of simultaneously processed streams is N, in order to maintain the real time property of all the streams, the following formula must be satisfied.

$$Bhdd \times Ts > N \times (Tw+Ts) \times Bsys \qquad (1)$$

However, Ts is a time required to read/write a block length L, which is the read/write unit, to/from the HDD 118. This is expressed as Ts=L/Bhdd.

The above-mentioned formula (1) means that a setting must be made such that, in a case where data is read out, in a given stream, the data amount where the unit block is read out is not completely exhausted within a time duration that is necessary to process N number of streams, which is a sum of N seek times and N data read/write times.

Further, the above-mentioned formula (1) also means that, in a case where data is written, during the time required to process N streams, the data amount accumulated in the buffer memories 115 and 116 must be N×(Tw+Ts)×Bsys, in the worst case.

Therefore, the capacity C of the buffer memories 115 and 116 must satisfy the following formula.

$$C > N \times (Tw+Ts) \times Bsys \qquad (2)$$

By performing a setting that satisfies the above-mentioned formulas (1) and (2), N number of streams can be processed simultaneously in real time. However, N must be set within a range that satisfies Bhdd>N×Bsys.

Note that, in a case where data of the real time file is transferred from the HDD 118 to the buffer memories 115 and 116, when the data is read out by units, the most efficient processing can be performed. In such a case, a unit capacity Usize can be expressed in the following formula.

$$Usize=L \qquad (3)$$

Here, as described above, since Ts=L/Bhdd, by substituting this equation and formula (3) for the above-mentioned formula (1), the following formula can be obtained, as a condition expression of the Usize capacity.

$$Usize > (N \times (Tw+(Usize/Bhdd)) \times Bsys) \qquad (4)$$

The image data and audio data having a predetermined duration are stored in the unit having this capacity. Note that, in the system according to this embodiment, the MPEG2-encoded image data (Group of Pictures: hereinafter, referred to as GOP), and the corresponding audio data, are multiplexed by the multiplexor/demultiplexor 111, and are turned into the system stream.

Further, when the quantity of pictures in 1 GOP is 15 and the system stream contains 5 GOPs, a reproduction time for 1 unit is as follows.

$$5*(15/30)=2.5 \text{ seconds.}$$

Here, a verification is made regarding whether or not reproduction by units is guaranteed with respect to these parameters.

According to the above-mentioned definition, when the write/read unit length is set as L=2752512 bytes, the MPEG2 system stream rate Bsys becomes, $$Bsys=L/2.5=1101004 \text{ bytes/second.}$$

In this digital storage and reproduction device, if the number of streams is N=2, the seek time worst value is Tw=50 ms, and the worst-case data transfer rate between the HDD controller module 118 and the HDD 119 is Bhdd=5 MB/second, then, $$Ts=L/Bhdd=550 \text{ ms}$$

is true. Therefore, Bhdd*Ts on the left side of formula (1) becomes, $$Bhdd*Ts=5\times10^6*550\times10^{-3}=2.7\times10^6$$

On the right side of formula (1), N*(Tw+Ts)*Bsys becomes, $$N*(Tw+Ts)*Bsys=2*(50+550)\times10^{-3}*1101004=1.32\times10^6,$$

thus satisfying the above-mentioned formula (1). Therefore, in these defined parameters, data reproduction by units is guaranteed.

Next, file read and write operations are explained using flow charts.

FIG. 4 is a flowchart for explaining a file data read operation.

First, when the file is opened by an application (step S1), the link information stored in the file management information 212 of the file is referenced (step S2). At this time, a reference position of the link information is managed using a pointer.

The block start address is obtained from the link information at a position indicated by the pointer, and the data is read out from the block on the storage area indicated by the block start address (step S3).

Next, it is judged whether or not this block is the last of the logical blocks comprising the file (step S4), and in a case where it is the last, the file is closed (step S5), and the read operation ends. On the other hand, in a case where the block is not the last of the logical blocks comprising the file, and a subsequent block exists, the pointer indicating the link information reference position is advanced by 1 (step S2), the block start address is obtained from the next link information, and the data is read out from the block on the storage area indicated by the bock start address (step S3). The above-mentioned data reading is repeated until it is judged that the block indicated by the pointer is the last block.

FIG. 5 is a flowchart for explaining a real time file write operation.

When the application opens the real time file (step S11), first, the unit attribute table 211 is referenced, and a unit which is unused is searched (step S12).

The unused unit obtained as a result of the search is assigned to a unit for storing a new file, and the main data 20 to be stored is sequentially stored into a sequence of blocks corresponding to the unit. At this time, the unit usage status information in the unit attribute table 211 corresponding to the unit used for storage is changed from "unused" to "RT all used". Further, in order to change the flag of the block used for storage to "1", the block management table 210 is updated. Further, the link information of each block used for storing is added to the file management information 212 (step S13).

Next, a judgment is made whether or not the data to be stored is remaining (step S14), and in a case where no data to be stored is remaining, the file is closed (step S15), and the processing ends. On the other hand, in a case where data to be stored is remaining, a further search is made for another unused unit (step S12). Then, data is stored into the unit obtained from the search (step S13). The above-mentioned data storage processing is repeated until it is judged at step S14 that no data to be stored remains.

FIG. 6 is a flowchart for explaining the write operation for the non-real time file.

When the application opens the non-real time file (step S21), first, the application references the unit attribute table 211, and searches whether or not an "NRT partially used" unit exists (step S22). In a case where the search result indicates that the "NRT partially used" unit does not exist, the unit attribute table 211 is referenced again, and an "unused" unit is retrieved (step S24). Then, the block corresponding to the obtained "unused" unit is assigned as a block for storing the main data 20.

Further, the unit usage status information of the unit attribute table 211 corresponding to the unit used for storage is changed from "unused" to "NRT partially used" (step S25).

On the other hand, in a case where the search result at step S22 indicates that the "NRT partially used" unit does exist, the unused block in the obtained "NRT partially used" unit is assigned as a block for storing the main data 20 (step S23). Here, in a case where all the unused blocks in the "NRT partially used" unit are being used for storing, the unit usage status information of this unit is switched from "NRT partially used" to "NRT all used".

Then, the main data 20 is stored into the unused block assigned at steps S23 and S24, and also, in order to change the flag of the block used for storing to "1", the block management table 210 is updated. Further, the link information of the block used for storage is added to the file management information 212 (step S26).

Next, a judgment is made whether or not the data to be stored is remaining (step S27), and in a case where no data to be stored is remaining, the file is closed (step S28), and the processing ends. On the other hand, in a case where data to be stored is remaining, a further search is made for another unused unit and unused block, and processing for storing the data into the block obtained from the search (steps S22 to S26) is repeated.

FIG. 7 is a flowchart for explaining a real time file delete operation.

When the real time file that the application deletes is selected (step S31), the block corresponding to the selected real time file is obtained from the file management information 212, and further, the unit corresponding to the block is obtained from the unit attribute table 211 (step S32). Then, the data stored in the block contained in this unit is sequentially deleted.

In this way, when the data stored in each block is deleted, the block management table 210 showing the usage status of this block is changed from "1" indicating that the block is in use, to "0" indicating that the block is unused. Further, when the data is deleted from all the blocks in 1 unit, the unit usage status information in the unit attribute table 211 indicating the usage status of this unit is changed from "RT all used" to "unused" (step S33).

Then, it is judged whether or not data to be deleted is remaining (step S34), and in a case where no data to be deleted is remaining, the management information of this file is deleted from the file management information 212 (step S35), and the processing ends.

On the other hand, in a case where data to be deleted is remaining, the pointer indicating the link information in the file management information 212 advances by 1, the next block is obtained, and the unit corresponding to the block is obtained from the unit attribute table 211 (step S32). Then, similarly to the case as described above, the block management table 210 and the unit attribute table 211 are updated (step S33). This updating processing (step S32, S33) is repeated until it is judged that no data to be deleted is remaining at step S34.

FIG. 8 is a flowchart for explaining the non-real time file deletion operation.

When the non-real time file to be deleted is selected by the application (step S41), the block corresponding to the selected non-real time file is obtained from the file management information 212 (step S42).

Next, the block management table 210 showing the usage status of this block is changed from "1" indicating that the block is in use, to "0" indicating that it is unused (step S43). Further, the usage status of the other blocks contained in the unit corresponding to this block are examined (step S44), and in a case where all the blocks comprising the unit are unused, the unit usage status information in the unit attribute table 211 showing the usage status of this unit is changed to "unused" (step S46).

Further, in a case where some of the blocks comprising the unit are partially being used, the unit usage status information in the unit attribute table 211 showing the usage status of this unit is changed to "NRT partially used" (step S45).

Next, it is judged whether or not data to be deleted is remaining (step S47). As a result of the judgment, in a case where it is judged that no data to be deleted is remaining, the management information of this file is deleted from the file management information 212 (step S48), and the processing ends. On the other hand, in a case where data to be deleted is remaining, the pointer indicating the link information in the file management information 212 advances by 1, and the next block is obtained (step S42). Then, similarly to the case as described above, the block management table 210 and the unit attribute table 211 are updated (steps S43 to S46). This updating processing (steps S42 to S46) is repeated until it is judged that no data to be deleted is remaining at step S47.

FIG. 9 is a flowchart for explaining an initialization operation of the storage medium.

When the storage medium is first used in this device, in order to be able to use the storage medium in this device, management data used in managing the storage area, specifically the block management table 210 and the unit attribute table 211 in the metadata 21, are generated, and the initial setting is performed.

The unit capacity and the unit quantity are set by the application, and the initial setting of the unit attribute table 211 is performed according thereto (step S51).

In the block management table 210, the "0" indicating that the usage status is "unused" is set for all the blocks (step S52).

In the unit attribute table 211, for all the units, the condition information is set as "RT useable unit", which indicates that the real time file can be stored. Further, as the usage status of the units, "unused" is set, which indicates that all the blocks comprising the unit can be stored (step S52).

As described above, in accordance with this embodiment, when managing the place where the main data is stored in the storage medium, in addition to use of the block which was used in the conventional file storage method and relied on the physical storage unit, the unit which is a storage unit suitable for storing the data processed in real time, is also used.

In this unit, the capacity at which the real time processing is guaranteed is set, the unit includes a plurality of continuous blocks, and since the unit and the corresponding blocks in the unit are calculated using the unit size information in the unit attribute table, even when real time file such as the image data stored by units is stored by units, the file data can be read out by blocks.

Further, with respect to the data processed in non-real time, the data is stored by blocks similarly to the conventional technique. However, the unit attribute table is also updated in response to the usage status of the block at this time.

In this way, depending on an attribute of the data, the storage unit is changed, to thereby enable efficient usage of the storage medium, and in turn, an occurrence of fragmentation of the storage area can be suppressed.

B. Second Embodiment

Moreover, according to the above-mentioned embodiment, the unit attribute table only sets 2 types of units, "RT usable unit" and "RT non-usable unit", in accordance with the use/non-use of the unit. However, as storage/deletion of data is repeated, a defective area which cannot be compensated by an error correction is generated. As a result, even if the unit is unused, there occurs a case where that unit cannot be used for storing/reproducing the real time file.

That is, in order to handle the occurrence of the defective area, the hard disk or other such storage medium is generally provided with a substitute area. In the case where the defective area occurs, data is assigned to the substitute area.

However, the substitute area is generally arranged physically spaced from the series of storage areas. Therefore, in the case where data is stored to the substitute area, extra time is required for seeking and for rotational delay and the like at the time of storage and reproduction. Therefore, even when the unit is in the "unused" state, when the unit has the defective area, there occurs a case where the write/read rate required to store/reproduce the real time file could not be guaranteed. Accordingly, even if the unit is unused, when the defective area occurs, there occurs a case where the unit cannot be used as the "RT usable" unit as it is.

On the other hand, for example, in a digital broadcast, the bit rate in a case of a HD (High Definition) broadcast is approximately 24 Mbps, and the bit rate in a case of a SD (Standard Definition) broadcast is approximately 8 Mbps. Therefore, in the case where the defective area occurs in the predetermined unit, even if the unit cannot be used for the HD broadcast, it may be usable for the SD broadcast which has the lower bit rate. Accordingly, even when the write/read rate of the unit declines due to the occurrence of the defective area, the entire unit should not be changed to "RT unusable".

Therefore, in accordance with this embodiment, a rank division of the write/read rate is assigned per unit, and this rank division is contained in the above-mentioned unit attribute table. Then, when the real time file is written, the rank division is referenced, and the unit where the file transfer rate can be guaranteed is selected as the target unit.

Each unit, in the initial state, is classified into the highest rate rank division. Then, at the subsequent writing/reading time, it is determined whether or not the real time file transfer rate was guaranteed. Here, in a case where it was not guaranteed, the unit is changed to a lower rank division than the transfer rate of the file.

The determination of whether or not the real time file transfer rate was guaranteed is made, for example, by using a special command used when the HDD (Hard Disk Drive) is used for AV data storage. This command is a command placing importance on the real time property for executing time-restricted reading and writing.

<Time-Restricted Reading/Writing Command>

Here, definition of time means that the HDD necessarily returns a reply to a host side within a designated time duration. In a case where such commands are used, priority levels of the processing on the HDD side are as follows.

1. Input/output of normal data is finished within the designated time duration, and the host is notified.
2. In a case where an error occurs during the processing, and a retry and substitute processing are necessary:

If the processing is possible within the designated time, the processing is executed. If it will exceed the designated time, the error is ignored, the input/output processing of the designated sector number is finished within the designated time, and the host is notified. In this case, the notification "An error has occurred, but the input/output is complete" is notified to the host, and error information is stored in a log. In this case, the integrity of input/output data may not be guaranteed.

3. In a case where the input/output processing does not end even when the error that occurred is ignored:

The processing is stopped within the designated time, the notification "Time-out error" is notified to the host. In principle, it is assumed that the reply is to be returned within the designated time. However, as an exception, the reading/writing should be performed at least one time, and only when the designated time is already exceeded at this point, the reply does not have to occur within the designated time. However, it is necessary to notify the host that "the designated time is exceeded".

As described above, in the case where there was a defect in the above-mentioned unit in the HDD storage medium, the real-time property of the data access at that portion deteriorates. Therefore, if the above-mentioned unit condition information of each unit has the bit rate rank division that can guarantee the real time processing, this is referenced, and various bit-rate data are assigned to the respective appropriate unit, whereby the real-time property is guaranteed, and storage effectively using the storage medium can be achieved.

Hereinafter, explanation is given regarding a specific structure and controls according to this embodiment.

<Substitute Area>

In the case where the defect occurred on the HDD storage medium, a substitute block is generally assigned.

In a case of an optical disk, a position, quantity and the like of the substitute block are determined as a standard. However, in the case of the HDD, only the command interface is determined, and an interior structure depends on each drive vender. Therefore, a substitute processing sequence, a substitute block position, an overhead time when reading and writing of the substitute block and the like, are not determined. This becomes a problem in the case of the real time processing, which is explained below.

<Relationship between a Physical Address and a Logical Address, and Fragmentation>

FIG. 13 shows relationships among a physical address on the media, a logical address, and a defective block management list. Hereinafter, explanation is given regarding a defective block processing sequence, and fragmentation occurring therewith.

Using the hard disk as an example, generally, at the usage start time, one can assume that the continuity of the logical addresses accessed from the host, has the continuity of the physical addresses on the media. Originally, the defective sector which already existed at the time when the product was shipped, undergoes the substitution processing at the time of shipment. For the sake of simplicity, explanation of this is omitted here.

On the disk, the substitute block is prepared for the defective block which occurs after shipping. In the case of the hard disk, the quantity and physical position of the substitute block is not determined. For example, the substitute block area may be arranged concentrated in an innermost track of the disk. Of course, there is no logical address mapping for this area.

As shown in FIG. 13, for example, in a case where it is judged that a logical block A is the defective block, the drive remaps a physical block A corresponding to the logical block A so as to correspond to a substitute block B+1. This information is registered in a defect list.

In this way, when the substitute processing for the defective block is performed, the unit corresponding to the block where the substitute processing was performed actually becomes the logical block A and becomes physically non-continuous, even if the logical address is continuous, and the seeking occurs before and after the block. This is a cause of a fatal problem for the real time processing.

<Correlation between AV Stream Real Time Guarantee and Substitute Processing>

Hereinafter, an example of the AV stream real-time processing is illustrated.

Assuming that the worst case transfer rate is a(MB/s), the worst case (seek time+rotational delay time) is b(sec), the unit size is c(MB), and the AV stream bit rate is d(MB/s), the worst case unit access (read/write) time becomes:

$$y=c/a(\text{sec}),$$

and the unit AV stream reproduction time becomes:

$$z=c/d(\text{sec}).$$

The relationship in the real-time processing of 1 AV stream becomes the following formula.

$$y+b<z \text{ namely, } y<z-b$$

The relationship in the real-time processing of 2 AV streams becomes the following formula.

$$2*(y+b)<z \text{ namely, } y<z/2-b$$

In a case of 1 AV stream where n places of the unit are distributed to the substitute block, the relationship in the real time processing becomes the following formula.

$$y+(n+1)b<z \text{ namely, } y<z-(n+1)b$$

In the unit where 2 AV streams are alternately accessed, in a case where a total of n places are arranged as the substitute blocks for any 2 continuously accessed units, the relationship in the real-time processing becomes the following formula.

$$2y+(n+2)b<z \text{ namely, } y<z/2-(n+2)b/2$$

In this way, the more substitute processing is, the longer the unit access time becomes. Then, when a certain threshold is exceeded, the real-time property fails.

Therefore, it is necessary to change the unit to "non-usable" when the substitute blocks increase to a certain point.

<Unit Attribute Table>

The unit attribute table 211 regards the storage area on the HDD 118 as address space divided into units, and assigns unit numbers to them in sequence, and thus manages the usage status of each unit.

The unit is composed of entries 211*a*, 211*b* . . . as shown in FIG. 3. For example, the entry 211*a* is the entry of the unit corresponding to the entries 210*a*, 210*b*, 210*c* and 210*d* on the block management table 210. The unit attribute table 211 determines a unit condition information showing whether or not the real time file can be stored in the unit, and a unit usage status information showing the usage status of the unit.

The unit condition information and the unit usage status information of each unit, are divided as shown in FIG. 10.

The unit usage status information shows 4 conditions, that is, "RT all used", "unused", "NRT partially in use" and "NRT all used", the same to the first embodiment.

The unit status information shows either "RT usable unit" or "RT unusable unit". Here, "RT usable unit" indicates a status where the real time information can be stored. Further, "RT unusable unit" indicates a status where the real time information cannot be stored.

The above-mentioned "RT usable unit" is divided into, for example, 3 levels, that is, "Unit usable with RT stream up to 30 Mbps", "Unit usable with RT stream up to 15 Mbps", and "Unit usable with RT stream up to 5 Mbps", depending on the bit rate of the real time stream.

As described above, for example, in the digital broadcast, the bit rate in the case of the HD broadcast is approximately 24 Mbps, and the bit rate of the SD broadcast is approximately 8 Mbps. In this case, even the unit which cannot be used to store an HD broadcast program, can be used to store an SD broadcast program. Further, in a case where an analog broadcast is stored, for example, 3 bit rates may be considered: a 10-Mbps high-quality recording mode; a 6-Mbps standard recording mode; and a 3-Mbps long-time recording mode. In this case, the unit which cannot be used in the high-quality recording mode may be usable in the standard recording mode or the long-time recording mode.

The unit is the area which can be continuously stored on the physical media. However, in the case where the defective block was discovered, that block is reassigned to the substitute area. In this case, even if the storing is logically continuous, physically a boundary occurs and the seeking and the rotational delay time are required. This can be fatal to the real time processing in some cases.

Therefore, in the initial state, the unit is usable in the highest bit rate rank, as the real time processing. However, as it continues to be used, the bit rate that the unit can handle varies. Therefore, the host side checks whether or not the unit is usable, and in a case where it determines that the unit is unusable, it is necessary to change the unit to indicate that the real time information cannot be stored.

This check by the host side, for example, can be executed by using the time restricted command placing the above-mentioned time restriction on the reading or writing of the unit. The time restriction parameter is a duration of time limitation before which the real time, operation will not fail, as determined by the bit rate.

This command is used, and the unit that exceeds the time restriction is non-usable at that bit rate. Therefore, the bit rate rank is assumed to be lower than the bit rate of the command.

Here, the command bit rate refers to the command's read and write operation object data size divided by the restricted time. The unit which is non-usable even at the lowest bit rate is regarded as "RT unusable unit".

FIG. 11 is a flowchart for explaining a file data read operation in the second embodiment.

First, when the file is opened by an application (step S61), the link information stored in the file management information 212 of the file is referenced. At this time, a reference position of the link information is managed using a pointer.

The block start address is obtained from the link information at a position indicated by the pointer, and the data is read out from the block on the storage area indicated by the block start address by a time-restricted AV command (step S62).

Next, by using the above-mentioned time restricted Read command, it is judged whether or not the status "designated time is exceeded" has occurred (step S63). As a result of the judgment, in a case where it is judged that the "designated time is exceeded" error has occurred, the usable bit rate rank shown in the unit condition information of the unit attribute table 211 corresponding to the used unit, is changed to a lower rank than the bit rate of the command (step S64).

Then, it is judged whether or not the block being read is the last logical block comprising the file (step S65), and in a case where it is the last, the file is closed (step S66) and the read operation ends.

In a case where the block being read is not the last logical block comprising the file, and the subsequent block exists, the pointer indicating the reference position of the link information is advanced by 1, the block start address is obtained from the subsequent link information, and data is read out from the block on the storage area indicated by the block start address (step S62). This reading processing (steps S62 through S64) is repeated until it is determined at step S65 that the block being read out is the last block.

FIG. 12 is a flowchart for explaining a real time file write operation in the second embodiment.

When the application opens the real time file (step S71), first, the unit attribute table 211 is referenced, and a unit which is unused and usable at the writing bit rate is searched (step S72).

The unit obtained as a result of the search is assigned to a unit for storing a new file, and the main data 20 to be stored is stored into a sequence of blocks corresponding to the unit by the time restricted write command. At this time, the unit usage status information in the unit attribute table 211 corresponding to the unit used for storage is changed from "unused" to "RT all used". Further, in order to change the flag of the block used for storage to "1", the block management table 210 is updated. Further, the link information of each block used for storing is added to the file management information 212 (step S73).

Next, according to the time restricted write command at step S73, it is judged whether or not the status "designated time is exceeded" has occurred (step S74). As a result of this determination, in a case where the "designated time is exceeded" error has occurred, the usable bit rate rank shown in the unit condition information of the unit attribute table 211 corresponding to the used unit, is changed to a lower rank than the bit rate of the command (step S75).

Next, a judgment is made whether or not the data to be stored is remaining (step S76), and in a case where no data to be stored is remaining, the file is closed (step S77), and the processing ends. On the other hand, in a case where data to be stored is remaining, the processing from step S72 is further repeated.

In the read operation and the write operation, assuming that there is no read error or write error, in the case where the "designated time is exceeded" error occurs due to the time restricted command, it can be judged that the block is already in the fragmented state. Therefore, in this case, the usable bit rate rank shown in the unit condition information is changed to a lower rank than the bit rate of the command.

Note that the initialization operation of the storage medium according to the second embodiment is performed similarly to the initialization operation (FIG. 9) of the storage medium according to the first embodiment. Here, at step S52, the condition information can further be set as "RT usable unit (up to bit rate a Mbps)", which indicates that the real time file with the highest bit rate that can be stored.

As described above, in accordance with this embodiment, as in the above-mentioned first embodiment, the real time file and the non-real time file writing processing can be performed smoothly and efficiently. In addition to this merit, the various real time file data having different required bit rates can be efficiently assigned and stored onto the same HDD, thereby producing a merit of further improving the usage efficiency of the HDD.

Note that, it goes without saying that the present invention is not restricted to the above-mentioned embodiment. The above-mentioned embodiment was explained using the digital storage and reproduction device for storing/reproducing the MPEG data was given as an example. However, in addition to this, the present invention may be used widely in a digital storage and reproduction device for storing/reproducing only audio data, and a storage and reproduction device for storing/reproducing data obtained via the Internet.

Further, the processing for generating various tables shown in FIG. 2 and FIG. 10, and a program for executing the processing shown in FIG. 4 through FIG. 9, FIG. 1 and FIG. 12 can be pre-installed in the HDD control module 117, and also may be downloaded from a CD-ROM or other such storage medium, or can be achieved by downloading from an application server via the Internet.

Additionally, timing of updating the metadata, timing of structuring the metadata file, and the like, may be modified as needed.

What is claimed is:

1. A file data storage management method for storing file data into a storage area divided into a plurality of blocks for real time main data storage and non-real time main data storage without pre-designation of a data storage attribute, comprising the steps of:
   generating a block management table for managing whether or not data are being stored in a block;
   generating a unit attribute table for managing an attribute of a unit containing a continuous plurality of blocks, the unit having a capacity to guarantee a read-out rate required for the file data;
   storing the file data based on the unit attribute table; and
   generating link information for determining, for file data, a link to the block used to store the file data, wherein:
   the unit attribute table includes information indicating a usage status of each unit and information determining whether or not real time data can be stored,
   the step of storing the file data comprising:
   in a case where the file data to be stored is the real time data, referencing the unit attribute table, searching an unused unit where the real time data can be stored, and storing the file data into the blocks corresponding to the searched unit; and
   in a case where the file data to be stored is non-real time data, referencing the unit attribute table, searching a unit where the non-real time data is already stored in a portion of the blocks, searching unused blocks contained in the searched unit that already contains non-real time data while referencing the block management table, and storing the file data into the unused blocks obtained by the search, and
   a unit capacity Usize satisfies:

$$Usize > (N \times (Tw + (Usize/Bhdd)) \times Bsys)$$

where a minimum data transfer rate to/from storage means is Bhdd, a bit rate of a data stream is Bsys, a worst value of seek time in the storage means is Tw, and a number of streams processed simultaneously is N.

2. A file data storage management method according to claim 1, wherein, if writing in and/or reading out the file data cannot be performed with required rate, with respect to the unit used to store the file data, information indicating that the real time data cannot be stored is updated in the unit attribute table.

3. A file data storage management method according to claim 1, wherein,
   the step of storing the file data comprises,
   in a case where the file data to be stored is the non-real time data, referencing the unit attribute table, and when the unit where the non-real time data is already stored in a portion of the blocks cannot be obtained, referencing the unit attribute table, searching the unused unit, and storing the file data into the blocks corresponding to the unit obtained by the search.

4. A file data storage device comprising:
   a storage medium divided into a plurality of blocks for storing real time and non-real time file data without pre-designation of a data storage attribute;
   a block management table generating portion for generating a block management table for designating whether or not data are being stored in a block;
   a unit attribute table portion for generating a unit attribute table for designating an attribute of a unit containing a continuous plurality of the blocks, the unit having a capacity to guarantee a read-out rate required for the file data, the unit attribute table including a usage status of each unit and information determining whether or not real time data can be stored; and
   a link table generating portion for determining, for file data, a link to the block used to store the file data; wherein
   the file data are stored based on the unit attribute table in accordance with the following criteria:
   if the file data to be stored are real time data, the unit attribute table is searched for an unused unit for storage of the real time file data into the blocks corresponding to the searched unit;
   if the file data to be stored are non-real time data the unit attribute table is searched for a unit in which a portion of blocks already store non-real time data and contain a sufficient number of unused blocks for storing the non-real time file data; and
   a unit capacity Usize satisfies:

$$Usize > (N \times (Tw + (Usize/Bhdd)) \times Bsys)$$

where a minimum data transfer rate to/from storage means is Bhdd, a bit rate of a data stream is Bsys, a worst value of seek time in the storage means is Tw, and a number of streams processed simultaneously is N.

5. A file data storage device according to claim 4, wherein, if writing in and/or reading out the file data cannot be performed at a required rate in a searched unit, information indicating that the real time data cannot be stored in the searched unit is updated in the unit attribute table.

6. A file data storage device according to claim 4, wherein, if the unit searched for blocks already storing non-real time data contains an insufficient number of unused blocks for storing the non-real time file data to be stored, the unit attribute table is searched for an unused unit for storing the non-real time file data therein.

7. A file data storage device comprising:
   a storage medium for storing file data, the storage medium divided into a plurality of blocks for real time main data storage and non-real time main data storage without pre-designation of a data storage attribute; and a controller configured for generating a block management table for managing whether or not data are stored in a block, generating a unit attribute table for managing an attribute of a unit containing a continuous plurality of the blocks, the unit having a capacity to guarantee a read-out rate required for the file data, the unit attribute table including a usage status of each unit and information determining whether or not real time data can be stored, determining, for file data, a link to the block used to store the file data, and executing processing for storing the file data based on the unit attribute table, the executed processing comprising:

in a case where the file data to be stored is real time data, referencing the unit attribute table, searching the unit unused unit where the real time data can be stored, and storing the file data into the blocks corresponding to the searched unit; and in a case where the file data to be stored is non-real time data, referencing the unit attribute table, searching the unit where non-real time data is already stored in a portion of the blocks, and storing the file data into the unused blocks corresponding to the searched unit, wherein a unit capacity Usize satisfies:

$$U\text{size} > (N \times (Tw + (U\text{size}/Bhdd)) \times Bsys)$$

where a minimum data transfer rate to/from storage means is Bhdd, a bit rate of a data stream is Bsys, a worst value of seek time in the storage means is Tw, and a number of streams processed simultaneously is N.

8. A file data storage device according to claim 7, wherein, if writing in and/or reading out the file data cannot be performed at a required rate in a searched unit, information indicating that the real time data cannot be stored in the searched unit is updated in the unit attribute table.

9. A file data storage device according to claim 7, wherein, if the unit searched for blocks already storing non-real time data contains an insufficient number of unused blocks for storing the non-real time file data to be stored, the unit attribute table is searched for an unused unit for storing the non-real time file data therein.

10. A computer readable storage medium having a program for executing processing for storing file data into a storage area divided into a plurality of blocks for real time main data storage and non-real time main data storage without pre-designation of a data storage attribute, the program, when executed, causing a computer to perform the steps of:

generating a block management table for managing whether or not data is stored in a block;

structuring a unit from a continuous plurality of the blocks, and generating a unit attribute table for managing an attribute of each unit, the unit having a capacity to guarantee a read-out rate required for the file data, the unit attribute table including a usage status of each unit and information determining whether or not real time data can be stored;

processing, for each data file, a link to the block used to store the file data; and storing the file data based on the unit attribute table, the storing the file data comprising:

in a case where the file data to be stored is real time data, referencing the unit attribute table, searching the unused unit where the real time data can be stored, and storing the file data into the blocks corresponding to the searched unit; and in a case where the file data to be stored is non-real time data, referencing the unit attribute table, searching the unit where non-real time data is already stored in a portion of the blocks, and storing the file data into the unused blocks corresponding to the searched unit, wherein a unit capacity Usize satisfies:

$$U\text{size} > (N \times (Tw + (U\text{size}/Bhdd)) \times Bsys)$$

where a minimum data transfer rate to/from storage means is Bhdd, a bit rate of a data stream is Bsys, a worst value of seek time in the storage means is Tw, and a number of streams processed simultaneously is N.

11. A computer readable storage medium according to claim 10, wherein, if writing in and/or reading out the file data cannot be performed at a required rate in a searched unit, information indicating that the real time data cannot be stored in the searched unit is updated in the unit attribute table.

12. A computer readable storage medium according to claim 10, wherein, if the unit searched for blocks already storing non-real time data contains an insufficient number of unused blocks for storing the non-real time file data to be stored, the unit attribute table is searched for an unused unit for storing the non-real time file data therein.

* * * * *